(12) United States Patent
Dickie

(10) Patent No.: US 9,672,241 B2
(45) Date of Patent: Jun. 6, 2017

(54) REPRESENTING AN OUTLIER VALUE IN A NON-NULLABLE COLUMN AS NULL IN METADATA

(71) Applicant: International Business Machines Corporation, Armonk, NY (US)

(72) Inventor: Garth A. Dickie, Framingham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 14/288,884

(22) Filed: May 28, 2014

(65) Prior Publication Data

US 2015/0347492 A1      Dec. 3, 2015

(51) Int. Cl.
*G06F 17/00*      (2006.01)
*G06F 17/30*      (2006.01)

(52) U.S. Cl.
CPC .............................. *G06F 17/30371* (2013.01)

(58) Field of Classification Search
CPC ................................................ G06F 17/30371
See application file for complete search history.

(56) References Cited

U.S. PATENT DOCUMENTS

| | | | |
|---|---|---|---|
| 6,973,452 B2 | 12/2005 | Metzger et al. | |
| 7,657,567 B2 | 2/2010 | Reichart et al. | |
| 7,702,649 B1 | 4/2010 | Bresch et al. | |
| 7,945,557 B2 | 5/2011 | Cheng et al. | |
| 8,108,400 B2 | 1/2012 | Graefe | |
| 8,266,147 B2 | 9/2012 | Slezak et al. | |
| 2008/0071748 A1* | 3/2008 | Wroblewski | ...... G06F 17/30448 |
| 2008/0281845 A1 | 11/2008 | Shankar | |
| 2010/0082581 A1* | 4/2010 | Kreibe | ................... H04L 67/02 |
| | | | 707/706 |

(Continued)

OTHER PUBLICATIONS

Data for Oracle Data Mining, May 24, 2012, section 2.3.1 https://docs.oracle.com/cd/B19306_01/datamine.102/b14339/2data.htm.*

(Continued)

*Primary Examiner* — Augustine K Obisesan
*Assistant Examiner* — Lahcen Ennaji
(74) *Attorney, Agent, or Firm* — Erik K. Johnson; Edell, Shapiro & Finnan, LLC

(57) ABSTRACT

According to embodiments of the present invention, methods, systems and computer-readable media are presented for accessing data within a database object, wherein an element of the database object is stored among a plurality of different storage regions with each storage region being associated with first and second range values indicating a value range for element values within that storage region. One or more element values within a storage region are identified residing outside a range of values of remaining elements within that storage region. Each identified element value is mapped to a second value. The first and second range values are determined for the storage region in accordance with the range of values of the remaining elements within that storage region. The storage region is scanned in accordance with a comparison of a requested value to at least one of the determined first and second range values of those storage regions.

14 Claims, 8 Drawing Sheets

(56) References Cited

U.S. PATENT DOCUMENTS

| | | | |
|---|---|---|---|
| 2011/0078134 A1* | 3/2011 | Bendel | G06F 17/30312 |
| | | | 707/713 |
| 2012/0197919 A1 | 8/2012 | Chen et al. | |
| 2013/0246395 A1 | 9/2013 | Charlet et al. | |
| 2014/0081931 A1* | 3/2014 | Kung | G06F 17/30 |
| | | | 707/694 |
| 2015/0095299 A1 | 4/2015 | Dickie | |
| 2015/0095379 A1 | 4/2015 | Dickie | |
| 2016/0098446 A1 | 4/2016 | Dickie | |
| 2016/0098451 A1 | 4/2016 | Dickie | |

OTHER PUBLICATIONS

Slezak, Dominik, and Marcin Kowalski. "Intelligent granulation of machine-generated data." IFSA World Congress and NAFIPS Annual Meeting (IFSA/NAFIPS), 2013 Joint. IEEE, 2013.
Goetz Graefe, "Fast Loads and Fast Queries", T.B. Pedersen, M.K. Mohania, and A.M. Tjoa (Eds.): DaWaK 2009, LNCS 5691, pp. 111-124, 2009, Springer-Verlag, Berlin Heidelberg 2009.

* cited by examiner

REPRESENTING AN OUTLIER VALUE IN A NON-NULLABLE COLUMN AS NULL IN METADATA

BACKGROUND

1. Technical Field

Present invention embodiments relate to reducing computational workload for query evaluation, and more specifically, to reducing computational workload by utilizing information in zone maps.

2. Discussion of the Related Art

Searching for information using a query may result in a search of a large database table. Information stored in a large database table is typically not maintained in sorted form due to heavy computational cost associated with sorting and reorganizing. When query evaluation requires scanning a large table, some data warehouse management systems may maintain metadata about each region of table storage.

SUMMARY

According to an embodiment of the present invention, methods, systems and computer-readable media are presented for accessing data within a database object, wherein an element of the database object is stored among a plurality of different storage regions with each storage region being associated with first and second range values indicating a value range for element values within that storage region. One or more element values within a storage region are identified residing outside a range of values of remaining elements within that storage region. The identified element values are mapped to a second value. The first and second range values are determined for the storage region in accordance with the range of values of the remaining elements within that storage region. The storage region is scanned in accordance with a comparison of a requested value to at least one of the determined first and second range values of those storage regions.

BRIEF DESCRIPTION OF THE SEVERAL VIEWS OF THE DRAWINGS

Generally, like reference numerals in the various figures are utilized to designate like components.

DETAILED DESCRIPTION

Data warehouse queries may include scanning large data tables to find results in response to a query, and sorting and/or aggregating the results.

When a large table is stored on disk, it may be large enough or fragmented enough that it becomes time consuming to move the disk head to many different disk regions to search the large table. Metadata corresponding to a region of storage may be used to characterize table data contained within the region of storage. For example, a first range value may represent a minimum data value for each column, for each range of rows, and a second range value may represent a maximum data value for each column, for each range of rows. Both the first and second range values represent types of metadata that may be determined for various regions of storage, and (in combination with additional types of information) may also be referred to as "zone maps". The use of zone maps to identify particular data ranges within a storage region, according to present invention embodiments, reduces disk scan time and computational load. It should be noted that minimum range values and maximum range values of the zone map may be conservative. In other words, a minimum range value of a zone map entry may be less than the actual minimum for the corresponding storage region of data (e.g., due to a record deletion, etc.), and similarly, a maximum range value of a zone map entry may be greater than the actual maximum for the corresponding storage region of data.

In some cases, outlier values may be present in data to be stored, which may greatly reduce the effectiveness of using zone maps to increase computational efficiency. For example, outlier values, if included during determination of maximum and minimum range values for zone maps may result in "artificially" lowering or raising the minimum and maximum range values, resulting in range map values which poorly represent data distribution within a storage region, and therefore, adversely impact computational efficiency.

For some systems, an amount of metadata that may be stored as part of a zone map is limited by memory constraints. In such situations, approaches such as storing multiple intervals to represent multiple ranges of data or using an equal-height histogram to represent data distribution may not be possible.

Embodiments of the present invention provide techniques to identify and manage outlier values in order to maintain computational efficiency. In some embodiments, outliers may be represented as NULL values, allowing the zone map to more accurately reflect the distribution of data. A separate flag, indicting that NULL values are present, may also be stored as part of metadata. NULL values or markers may be used in database programming languages, e.g., Structured Query Language (SQL), to indicate a data value that does not exist in the database or is unknown.

Figure 1:
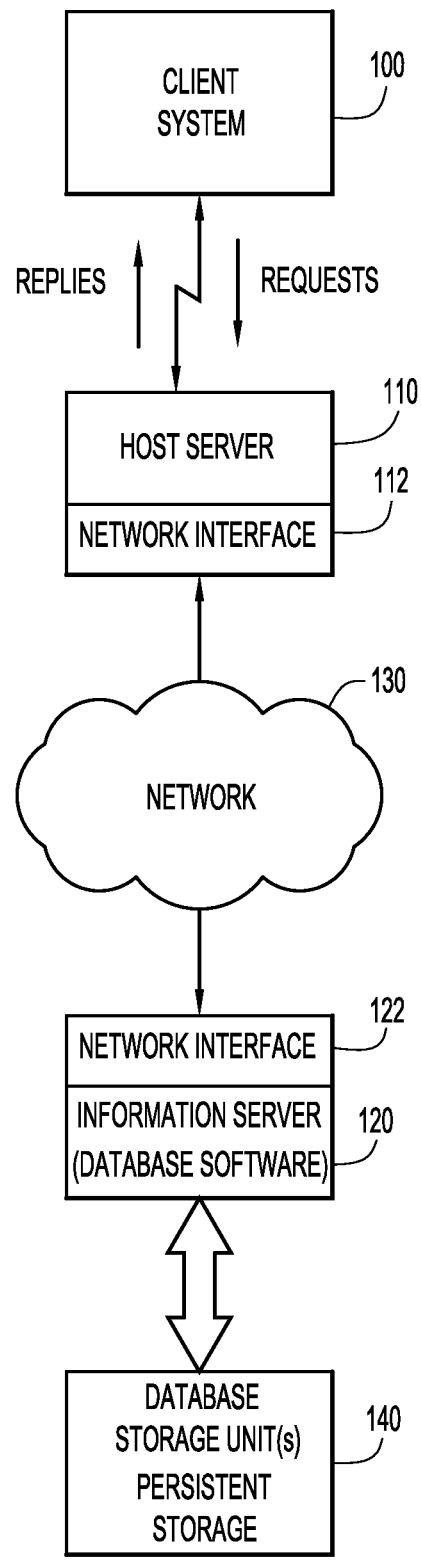
FIG. 1 is an illustration of an example computing environment for use with an embodiment of the present invention.

With reference now to FIG. 1, an example computing environment for use with present invention embodiments is illustrated. Specifically, the environment includes one or more client or end-user systems 100 and one or more server systems 110 and 120. Host server system 110 and information server 120 may be remote from each other and communicate over a network 130. Query requests, originating from client system 100 may be transmitted to information server 120 to search stored data (data in persistent storage) on database storage unit 140. Network 130 may be implemented by any number of any suitable communications media (e.g., wide area network (WAN), local area network (LAN), Internet, Intranet, etc.). Alternatively, server systems 110 and 120 may be local to each other, and communicate via any appropriate local communication medium (e.g., local area network (LAN), hardwire, wireless link, Intranet, etc.). Network interface units are shown at 112 and 122.

Client system(s) 100 enable users to submit documents (e.g., documents for document collections, documents for analysis, etc.) to information server system 120 for storage in database storage unit 140. As discussed herein, documents (or other information) may be added to existing database storage in storage regions (also referred to as extents).

Database storage unit 140 may store information for analysis (e.g., documents, etc.), and may be implemented by any conventional or other database or storage unit. Database storage unit 140 may be local to or remote from information server 120, and may communicate via any appropriate communication medium (e.g., local area network (LAN), wide area network (WAN), Internet, hardwire, wireless link, Intranet, etc.). Client system 100 may present a graphical user (e.g., GUI, etc.) or other interface (e.g., command line prompts, menu screens, etc.) in order to receive query information (e.g., parameters, clauses, etc.) from an end user and provide resultant data.

A plurality of database storage units 140 may be present in a data warehouse. An information server 120 may store and retrieve information from database storage unit 140, at the direction of host server 110. Host server 110 receives requests from and replies to client system 100. In one embodiment, the memory space within database storage unit 140 may be divided into several partitions, including a primary partition for storing user information, a mirror partition for storing a backup copy of the primary information, a temporary partition for holding intermediate results at the direction of information server 120, and a core partition for holding information about the physical layout of information within the database storage unit 140.

Figure 2A:
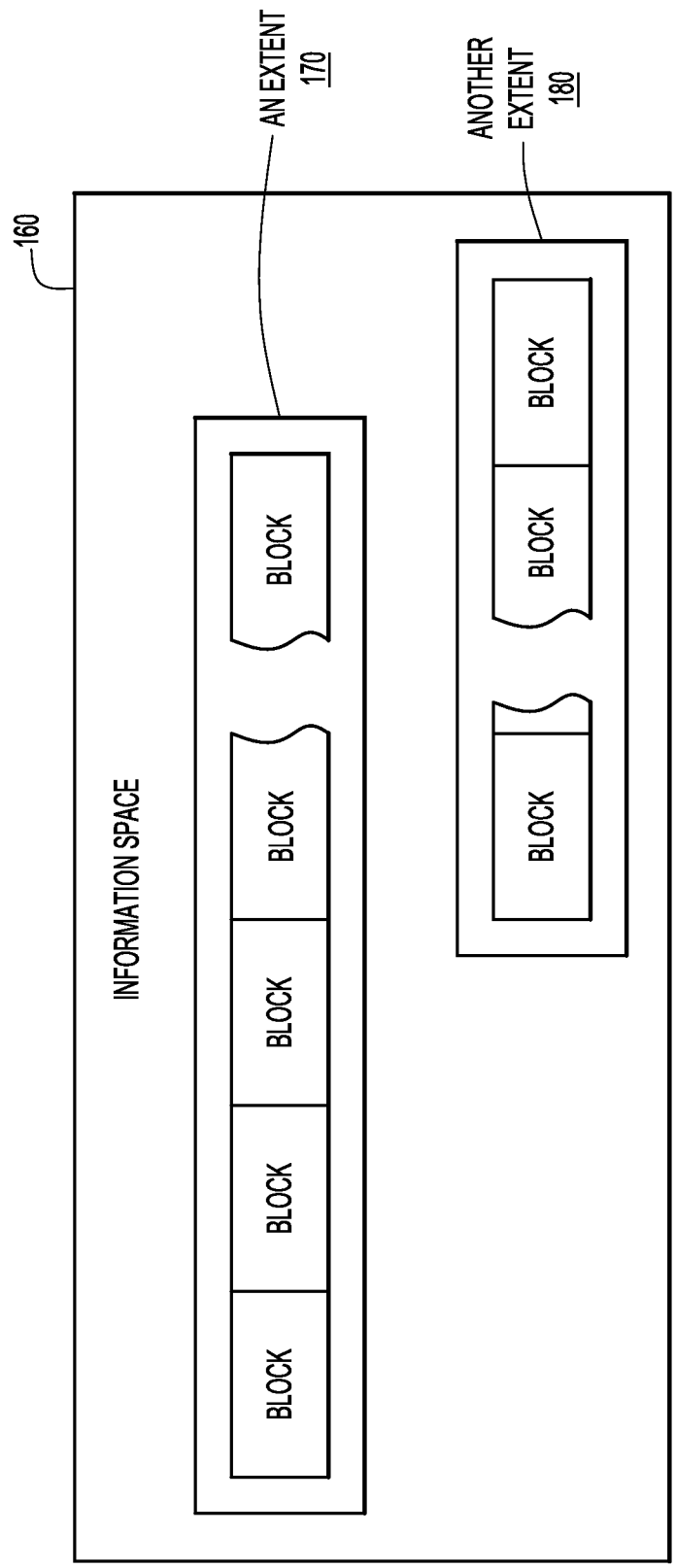
FIG. 2A is an illustration of an example of regions (extents) of table storage according to an embodiment of the present invention.

Referring to FIG. 2A, an embodiment of the invention operates by dividing a large space of information 160 into multiple smaller regions of information 170 and 180 (also referred to as "extents" or "storage regions"). Each extent may be further subdivided into a number of contiguous fixed size or variable size sub-extent blocks. An advantage of using fixed sizes is that certain computations become faster and less complex. In alternative embodiments of the invention, fixed sizes may also be changed dynamically, based on size or other characteristics of the overall database. Variable block sizes may be dynamically modified based on, e.g., a type of attribute. For example, if the minimum data value (also called first range values) and the maximum data value (also called second range values) refer to time stamp data, a size of the extent may be varied so that all data for a particular time period is stored in one data block. A block is an efficient unit of transfer between the database storage unit 140 holding the entire information space and the information server 120 capable of examining and manipulating the information. In one embodiment, a block may be 128K bytes, but other sizes could work as well.

An extent 170, 180 is a convenient unit of storage allocation, so that as an information space grows, its growth is quantized into units of extents. While the address space within an extent is contiguous (i.e., no holes) an information space 160 may consist of discontiguous extents, as there is no requirement that a later allocation of an extent should produce an address range that bears any fixed relationship to the address range of any earlier allocation.

Figure 2B:
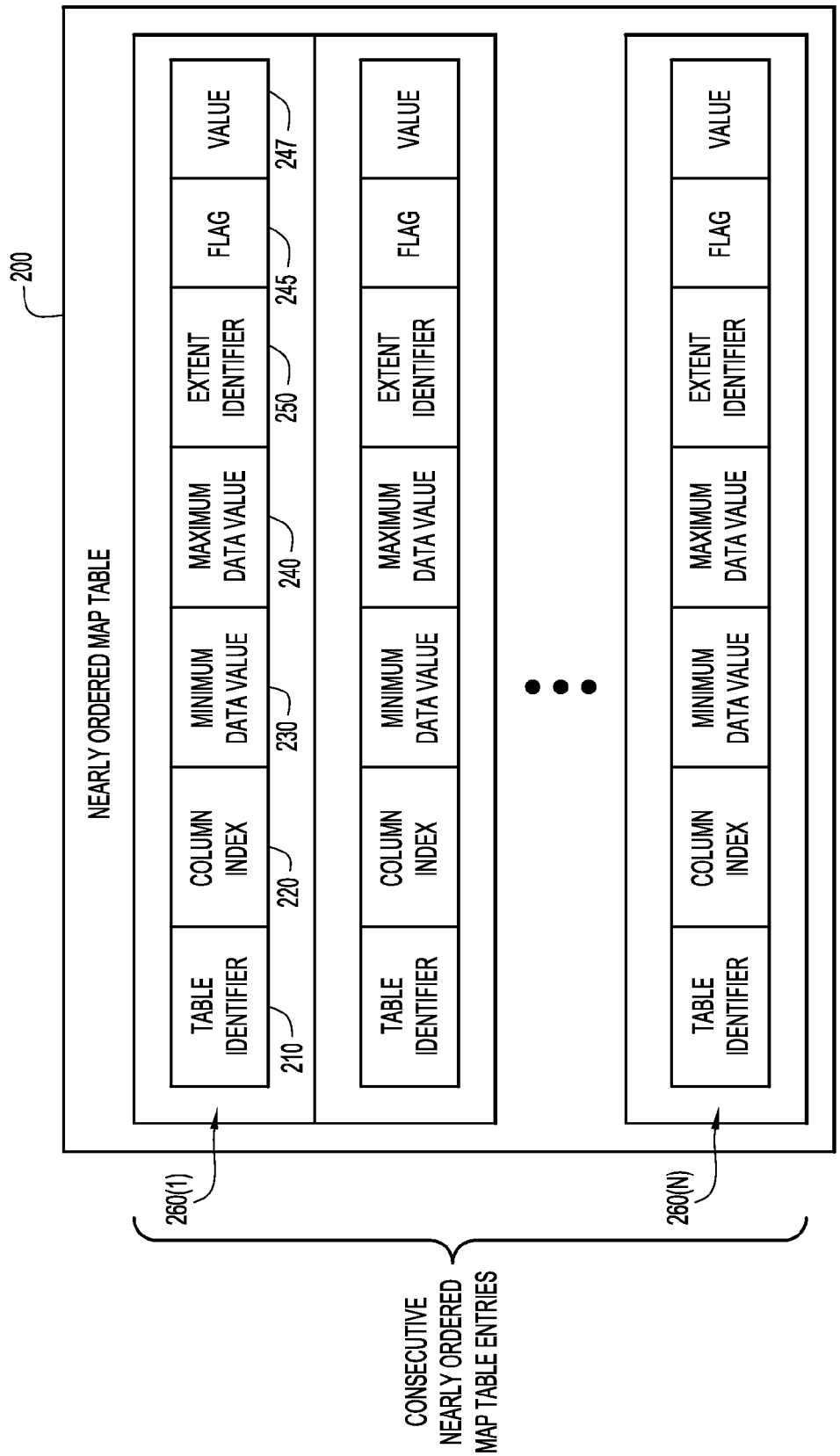
FIG. 2B is an illustration of an example of metadata corresponding to regions of table storage according to an embodiment of the present invention.

Referring to FIG. 2B, an embodiment of the present invention annotates extents with statistics (e.g., metadata) about the information the extent contains, and this information may be stored as entries in a nearly ordered map table or list 200. As shown in FIG. 2B, nearly ordered map table 200 shows a structure comprising a table identifier 210, a column index 220, a minimum data value 230, a maximum data value 240, a flag 245, a value 247, and an extent identifier 250. Multiple entries of metadata are shown at 260(1)-260(N). The table identifier 210 uniquely designates an information space, which may correspond to, e.g., a relational database table. In one embodiment, it is a 4-byte numeric value, which uniquely identifies a relational database table. The column index 220 uniquely identifies a particular class of information within the information space identified by the table identifier 210. In one embodiment, column index 220 is a 2-byte numeric value that denotes a column in the relational table identified by the table identifier 210. In another embodiment, the column index value 220 may correspond to the order in which columns are defined within the relational table.

In one embodiment of the invention, the minimum data value 230 and the maximum data value 240 may be 8-byte quantities that can hold different types of data values, including dates, times, date-times, integer values, etc. The actual types of data held by the minimum data value and the maximum data value are specified in the definition of the column that is denoted by the column index 220.

Minimum data value 230 and maximum data value 240 correspond to the minimum and maximum data values for particular kinds of information within an extent. When a query evaluation for information includes a restriction based on a value, the value can be compared to the metadata associated with each extent, e.g., the minimum data value of each extent, to determine if the extent should be searched. These techniques are described herein, e.g., in conjunction with FIGS. 3 and 4A-B. Flag 245 may contain information signifying whether a storage region contains outlier or values. Value 247 may contain the actual value of an outlier value. In some embodiments, flag 245 may specify whether a storage region contains no NULL values, all NULL values or a combination of both types of values. By using the metadata about the presence of NULLs as an indicator of the presence of the outlier value(s), conversion of predicates to tolerate the replacement of outliers by NULLS on a page-by-page basis is facilitated.

In one embodiment, the extent identifier 250 may be a 2-byte numeric value, which designates a particular extent within the information space as designated by table identifier 210. Larger storage partitions would use either 4-byte extent identifiers or larger extents.

Zone maps typically utilize a small amount of disk space, may be co-located with the corresponding data that they describe, introduce a amount of computational latency into the system, and may be maintained without sophisticated database administration experience. It is noted that the concept of zone maps are not limited to the particular types of metadata information shown in FIG. 2. Additional types of metadata information, used to characterize a region of storage (extent) are understood to fall within the scope of the embodiments disclosed herein.

Figure 3:
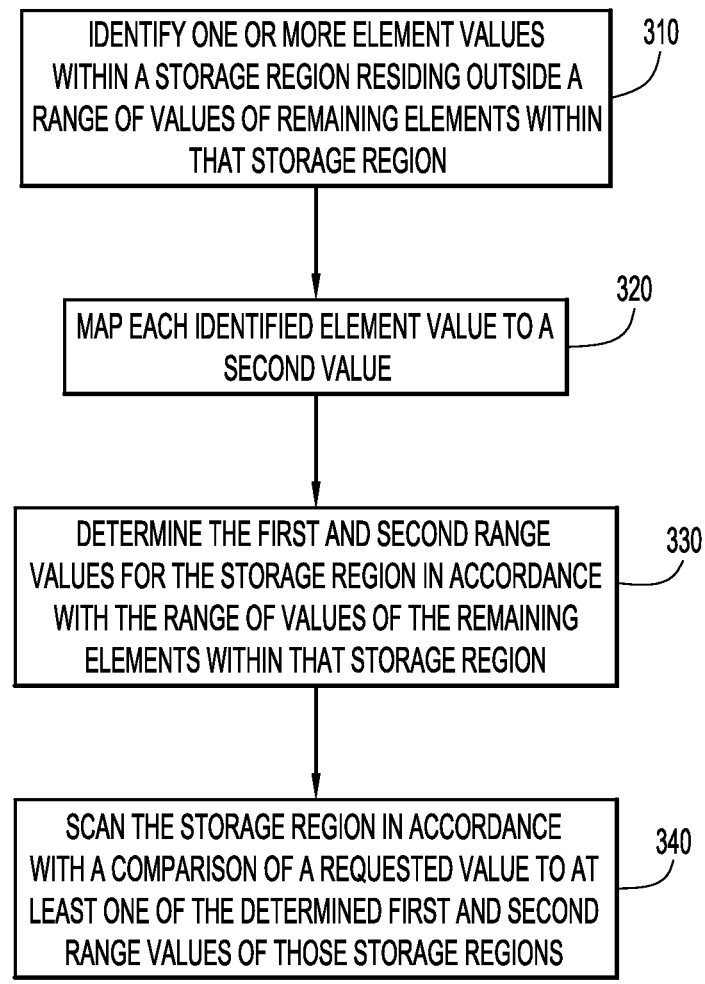
FIG. 3 is a procedural flow chart generally illustrating identifying outliers and excluding such outliers from being represented in range values associated with a storage region, according to an embodiment of the present invention.

FIG. 3 provides a general overview of embodiments of the present invention. Operation 310 shows identifying one or more element values within a storage region residing outside a range of values of remaining elements within that storage region. Operation 320 shows mapping each identified element value to a second value. Operation 330 shows determining the first and second range values for the storage region in accordance with the range of values of the remaining elements within that storage region. Operation 340 shows scanning the storage region in accordance with a comparison of a requested value to at least one of the determined first and second range values of those storage regions.

Figure 4A:
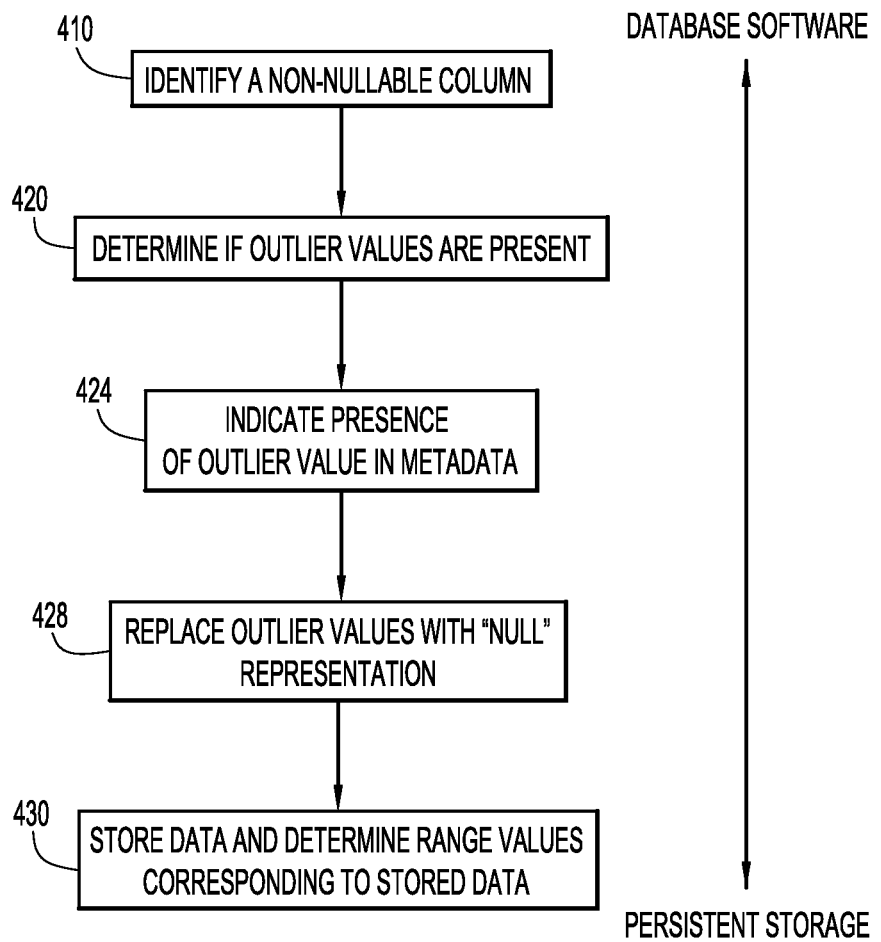
FIG. 4A is a more specific procedural flow chart based upon the flow chart of FIG. 3 and illustrating a manner in which outlier values may be identified and mapped to a different representation, for storage in a storage region, according to an embodiment of the present invention.

FIG. 4A shows a more detailed example, similar to the flow chart of FIG. 3. It is understood that the techniques provided herein may encompass alternate orderings of one or more of the operations shown in the figures. For example, different orderings of operations may occur to achieve the same result and are understood to be encompassed by the techniques disclosed herein.

Referring to FIG. 4A, a non-nullable column is identified at operation 410. In some database programs, columns having NULL values are not allowed. At operation 420, the non-nullable column is evaluated to determine if outlier values are present. An outlier value may be a value that falls outside a distribution, e.g., as determined by statistical methods, etc., of other values within the column. As discussed herein, outlier values may artificially skew minimum and maximum range values, and cause unnecessary scanning of storage regions, leading to increased computational workload. Multiple outlier values may be present, with each outlier value having a distinct value. In other embodiments, the non-nullable column may be determined to have a single outlier value (i.e. the same outlier value) for a group of outlier values. In other words, all outlier values may have the same value. If an outlier value is found, the presence of the outlier value may be indicated in metadata (e.g., by setting a flag 245 in the metadata, etc.), and the value of the outlier value may be determined and stored in metadata, at 424. At operation 428, all outlier values within a column may be mapped to an alternate representation (or representations), e.g., a NULL representation, for persistent storage. Accordingly, present invention embodiments encompass using (or re-purposing) an existing NULL representation mechanism. At 430, the mapped data is stored in persistent storage, and range values may be determined, wherein the range values represent a minimum range value and a maximum range value of the data, and are no longer skewed by outlier values.

In some embodiments, outlier values may be determined for each page of data, and outlier values may vary from page to page. A page is a unit of data storage, e.g., 64 KB, and in some embodiments, extents may be a collection of eight physically contiguous pages, with each page being about 8 KB. In this embodiment, a different outlier value may be mapped to a NULL representation and stored in metadata for each page. It is noted that with regard to present invention embodiments, blocks, pages, extents, and regions are essentially the same.

In other embodiments, the NULL representation, which may be the same value for multiple pages, is reported just once in metadata. This allows for not only providing more selective zone maps, but also, for providing improved compression as well.

A more specific example is presented herein with regard to deleter transaction IDs. In some systems, deleter transaction ID columns may be used in a multiversion concurrency control system for record visibility calculations, in order to meet Atomicity, Consistency, Isolation, Durability (ACID) compliance standards; such columns are not allowed to contain NULL values. Deleter transaction IDs are generally numerical values which correspond to transactions in which a row has been deleted or modified, for each column. Additionally, deleter transaction IDs are commonly used in predicates for data maintenance queries (e.g., groom or rollback operations). A deleter transaction ID of "0" may represent a non-deleted row, while a large deleter transaction ID may represent a deleted row.

Thus, for pages having all non-deleted rows, deleter transaction IDs may range from 0 to 0. For pages having all deleted rows, deleter transaction IDs may range from a large value to another large value. In both of these cases, the maximum and minimum range values provide a good representation of the distribution of data values.

However, in another scenario, a portion of rows may be deleted such that the deleter transaction ID column contains both very large values and small values (e.g., "0"). For example, for a given storage region, if all deleter transaction ID values fall within a range of 2,000,000-3,000,000, and all non-deleted rows are set to "0", outlier(s) of "0" will be present. In this case, unless the outlier value is managed appropriately, based on the techniques disclosed herein, the minimum range value will be "0" and the maximum range value will be a very large number, and will not accurately reflect the distribution of data. For example, a search for regions containing the value 1,000,000, would cause the region to be scanned, and would not retrieve relevant results, while impacting computational efficiency.

By identifying outlier values (in this case, outlier values are all "0") and mapping the outlier values to a NULL representation, corresponding minimum and maximum values for the page or regions will no longer include the outlier values. Instead, zone map data will reflect the distribution of the data, with the minimum range value being set to 2,000,000 and the maximum range value being set to 3,000,000. The storage layer represents the outlier value "0" in a non-null able column as NULL, which does not perturb the minimum and maximum range values for the corresponding zone map data, and leads to restoration in computational efficiency.

Figure 4B:
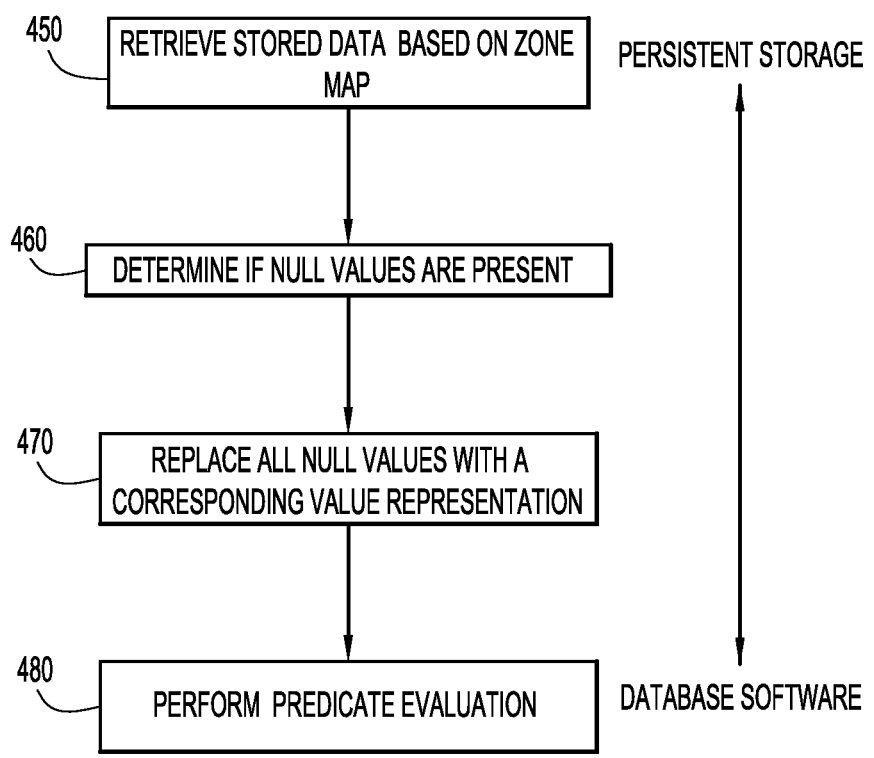
FIG. 4B is another procedural flow chart in which data containing NULL values may be replaced with a corresponding outlier value according to an embodiment of the present invention.

Referring to FIG. 4B, an example process is shown for retrieving stored data from the storage layer, recognizing that the data contains NULL values, and mapping the NULL values to the outlier value for processing within the database software. At operation 450, stored data is retrieved based upon information contained in the zone map data. At operation 460, the system determines whether the data contains NULL data, e.g., using a flag, other type of indicator, data inspection, etc. At operation 470, all NULL values are replaced with the corresponding outlier value, which was previously stored in the metadata (or any alternate location). At operation 480, predicate evaluation may be performed.

Figure 4C:
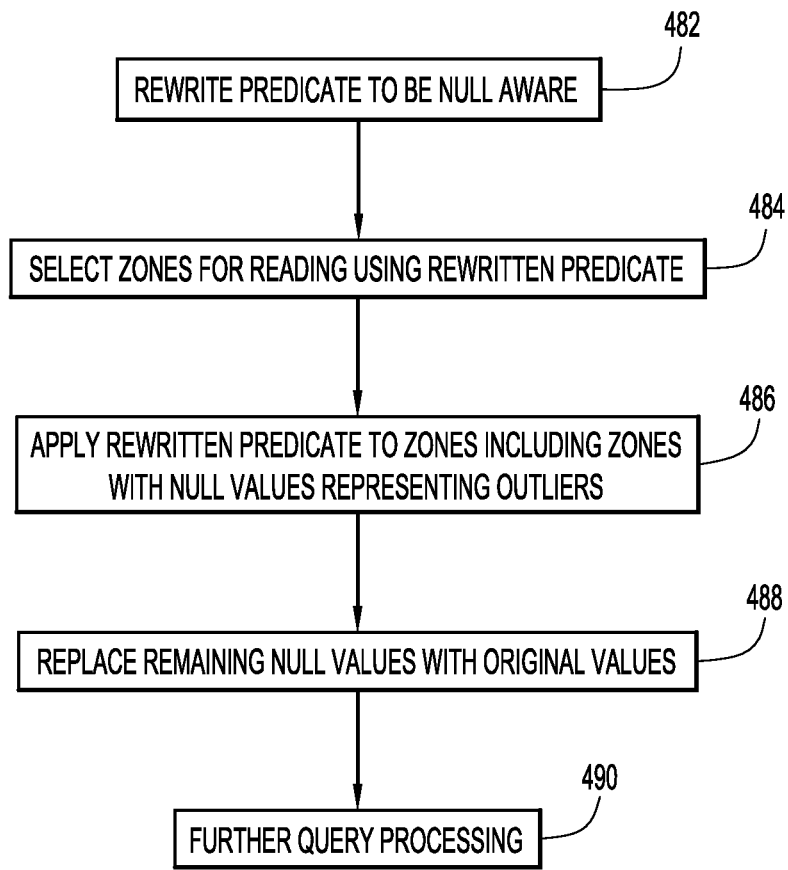
FIG. 4C is another procedural flow chart in which data containing NULL values are evaluated according to an embodiment of the present invention.

In other embodiments, for the computations associated with FIG. 4C, it is noted that a query rewrite may be performed such that predicates are re-written to be NULL aware before NULL values are substituted with a corresponding value representation. For example, the command "DELETEXID< >0", which corresponds to all deleter transaction IDs that are not equal to "0", may be rewritten to become "DELETEXID IS NOT NULL". Similarly, the command "DELETEXID<10000" may be rewritten to become "DELETEXID<10000" or "DELETEXID IS NULL". Accordingly, replacement of NULLs by the original value may be "pushed down" or delayed until after zone map evaluation and/or predicate evaluation has been performed, as part of normal query processing.

A procedural flowchart showing this process is provided at FIG. 4C. At 482, a predicate is rewritten to be NULL aware. At 484, zones are selected for reading/evaluating stored data based upon the rewritten predicate. At 486, the rewritten predicate is applied to zones including zones with NULL values representing outliers to identify data of interest (e.g., query results). At 488, remaining NULL values are replaced with corresponding original values. At 490, further query processing may occur. Thus, the replacement of NULLs with the actual value may be delayed until a point where the data needs to be computed on or transformed in a way which cannot be pushed down past the transformation. Because non-NULL values are a better behaved or denser range, predicate evaluation can become more selective and/or efficient.

Techniques disclosed herein are also relevant to database operations such as groom and rollback operations. In some embodiments, deleted (or updated) data may be retained on a system until a groom operation is performed. In a rollback operation, a state of a database is returned to a previous state (since the deleted data is still available). In this case, deleter transaction IDs may be rolled back to a value of "0" if a deletion is undone. Such operations may introduce outliers into data, and skew minimum and maximum range values, if not properly compensated for, according to the techniques presented herein.

Furthermore, when finding rows to be rolled back, a query is made which aims to select rows with a certain deleter transaction ID. As an example, a table may have many deleted rows that are mixed with many undeleted rows. According to present invention embodiments, pages which contain rows deleted by transactions less than or equal to the desired transaction and rows deleted by transactions greater than or equal to the desired transaction may be selected. For example, if transaction Tx 10 is rolled back, pages with both undeleted rows and rows deleted by Tx 10 may be selected, pages with undeleted rows and rows deleted by Tx 11 as well as pages that have undeleted rows and rows deleted by Tx 9 may be excluded. Without this feature, such a query would select all pages with undeleted rows and rows deleted by transactions greater than the desired transaction. In the example above, the desired page as well as the page with undeleted rows and rows deleted by transaction 11 would be selected.

When applied to the deleter transaction ID, queries which include record visibility constraints (as almost all do) may successfully include regions containing only undeleted and deleted-but-still-visible-to-this-transaction records, without having to read other regions. Queries involving transaction rollbacks can successfully exclude regions containing only undeleted records and records which were deleted before or after the rollback transaction.

Thus, according to present invention embodiments, an outlier value may be represented as NULL during writing to storage, interpreted as the outlier value during reading, and excluded when computing minimum range values and maximum range values for zone map data corresponding to a storage region. When a query scans a large information space for values in a specified range, according to present invention embodiments, outliers are identified and managed so as not to artificially skew minimum and maximum range values of zone map data. By managing outlier values, minimum and maximum range values reflect distribution of data, achieving computationally efficiency with regard to scanning a large space of information.

Present invention embodiments are not limited to a particular type of computing environment. For example, present invention embodiments may apply to a system comprising several computers or processes, each of which may independently manage outliers. Alternatively, present invention embodiments also apply to systems in which multiple computers may collaborate to manage outliers.

Figure 5:
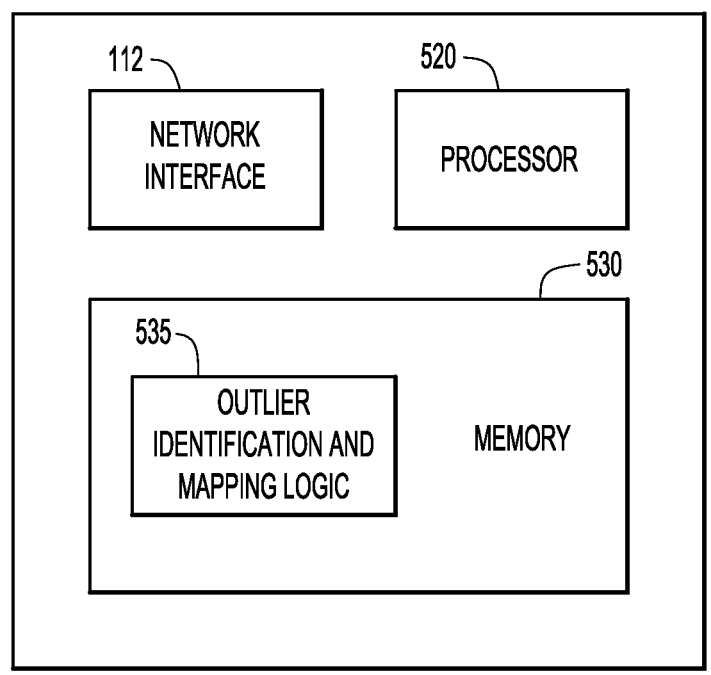
FIG. 5 is an example of a system/apparatus according to an embodiment of the present invention.

Referring to FIG. 5, an example embodiment of an information server 120 may comprise a network interface 112, a processor 520 and a memory 530. The network interface unit 112 is configured to enable network communications over network 130 e.g., to facilitate communication between information server 120 and host server 110 regarding query requests from client system 100 as shown in FIG. 1.

The processor 520 may be embodied by one or more microprocessors or microcontrollers, and executes computer readable program instructions stored in memory 530 to perform the operations described above in connection with FIGS. 1-4.

Memory 530 may comprise computer readable storage media encoded with software comprising computer readable program instructions, and when the software is executed by the processor 520, the processor 520 is operable to perform the operations described herein in connection with outlier identification and mapping logic 535.

Server systems 110 and 120 and client systems 100 may be implemented by any conventional or other computer systems preferably equipped with a display or monitor, a base (e.g., including at least one processor, one or more memories, and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Alternatively, one or more client systems 100 may analyze documents or submit queries when operating as a stand-alone unit. In a stand-alone mode of operation, the client system stores or has access to the data (e.g., database storage unit 140), and includes modules to formulate and/or send query requests to host server 110. The graphical user (e.g., GUI, etc.) or other interface (e.g., command line prompts, menu screens, etc.) solicits information from a corresponding user pertaining queries.

Module may include one or more modules or units to perform the various functions of present invention embodiments described herein. The various modules (e.g., logic module 535, etc.) may be implemented by any combination of any quantity of software and/or hardware modules or units, and may reside within memory 530 of the information server 120 for execution by processor 520.

It will be appreciated that the embodiments described above and illustrated in the drawings represent only a few of the many ways of implementing embodiments for.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing systems (e.g., desktop, laptop, PDA, mobile devices, etc.), and may include any commercially available operating system and any combination of commercially available and custom software (e.g., browser software, communications software, server software, etc). These systems may include any types of monitors and input devices (e.g., keyboard, mouse, voice recognition, etc.) to enter and/or view information.

It is to be understood that the software (e.g., outlier identification and mapping logic 535) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., software corresponding to logic 535, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or oilier processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., fate, databases, data structures, data or other repositories, etc.) to store information (e.g., database storage unit 140, zone maps, outlier values, flags, etc.). The database system may be implemented by any number of any conventional or other databases, data stores or storage structures (e.g., files, databases, data structures, data or other repositories, etc.) to store information (e.g., database storage unit 140, zone maps, outlier values, flags, etc.). The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., query requests from client 100, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Query results may include any information arranged in any fashion, and may be configurable based on rules or other criteria to provide desired information to a user.

The present invention embodiments are not limited to the specific tasks or algorithms described above.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention, in this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of accessing data within a database object, wherein an element of the database object is stored among a plurality of different storage regions in persistent storage with each storage region being associated with first and second range values indicating a value range for element values within that storage region, the computer-implemented method comprising:

identifying one or more element values within a storage region in persistent storage residing outside a range of values of remaining elements within that storage region, wherein the storage region contains column data in the persistent storage for a database program not allowing processing on columns with NULL values;

storing each identified element value in metadata of the storage region and mapping each identified element value to a NULL value in persistent storage;

determining the first and second range values for the storage region in accordance with the range of values of the remaining elements within that storage region;

scanning the storage region in accordance with a comparison of a requested value of a query to at least one of the determined first and second range values of those storage regions, wherein scanning the storage region comprises re-writing the query to account for the mapped NULL value in persistent storage of each identified element value; and substituting the mapped NULL value of each identified element value in persistent storage with the corresponding stored identified element value in the metadata of the storage region to provide non-null column data for the database program to process the query.

2. The computer-implemented method of claim 1, wherein the database object includes a database table, and the database object element includes a database table column.

3. The computer-implemented method of claim 1, wherein at least one identified element value is generated from rolling back a prior database operation.

4. The computer-implemented method of claim 1, wherein each identified element value is zero.

5. The computer-implemented method of claim 1, further comprising setting a flag in metadata, indicating whether mapped NULL values are present within the corresponding storage region.

6. A system comprising:
a memory comprising a plurality of different storage regions in persistent storage with each storage region being associated with first and second range values indicating a value range for element values within that storage region and wherein an element of a database object is stored among the plurality of different storage regions;
a network interface; and
a processor configured to:
identify one or more element values within a storage region in persistent storage residing outside a range of values of remaining elements within that storage region, wherein the storage region contains column data in the persistent storage for a database program not allowing processing on columns with NULL values;
store each identified element value in metadata of the storage region and map each identified element value to a NULL value in persistent storage;
determine the first and second range values for the storage region in accordance with the range of values of the remaining elements within that storage region;
scan the storage region in accordance with a comparison of a requested value of a query to at least one of the determined first and second range values of those storage regions, wherein scanning the storage region comprises re-writing the query to account for the mapped NULL value in persistent storage of each identified element value; and
substitute the mapped NULL value of each identified element value in persistent storage with the corresponding stored identified element value in the metadata of the storage region to provide non-null column data for the database program to process the query.

7. The system of claim 6, wherein the database object includes a database table, and the database object element includes a database table column.

8. The system of claim 6, wherein at least one identified element value is generated from rolling back a prior database operation.

9. The system of claim 6, wherein each identified element value is zero.

10. The system of claim 6, wherein the processor is configured to set a flag in metadata, indicating whether mapped NULL values are present within the corresponding storage region.

11. A computer program product for providing information to a user, wherein an element of a database object is stored among a plurality of different storage regions in persistent storage with each storage region being associated with first and second range values indicating a value range for element values within that storage region, and the computer program product comprising a computer readable storage medium having computer readable program code embodied therewith, the computer readable program code, when executed by a processor, causes the processor to:
identify one or more element values within a storage region in persistent storage residing outside a range of values of remaining elements within that storage region, wherein the storage region contains column data in the persistent storage for a database program not allowing processing on columns with NULL values;
store each identified element value in metadata of the storage region and map each identified element value to a NULL value in persistent storage;
determine the first and second range values for the storage region in accordance with the range of values of the remaining elements within that storage region;
scan the storage region in accordance with a comparison of a requested value of a query to at least one of the determined first and second range values of those storage regions, wherein scanning the storage region comprises re-writing the query to account for the mapped NULL value in persistent storage of each identified element value; and
substitute the mapped NULL value of each identified element value in persistent storage with the corresponding stored identified element value in the metadata of the storage region to provide non-null column data for the database program to process the query.

12. The computer program product of claim 11, wherein the database object includes a database table, and the database object element includes a database table column.

13. The computer program product of claim 11, wherein at least one identified element value is generated from rolling back a prior database operation.

14. The computer program product of claim 11, wherein each identified element value is zero.

* * * * *